United States Patent [19]

Wilson et al.

[11] Patent Number: 4,841,699
[45] Date of Patent: Jun. 27, 1989

[54] WALL PANEL WITH ACCESSIBLE INTERIOR CHANNELS FOR LAYING IN OF CABLES

[75] Inventors: Harold R. Wilson; Richard G. Haworth, both of Holland; Bryan R. Gingrich, Wyoming, all of Mich.

[73] Assignee: Haworth, Inc., Holland, Mich.

[21] Appl. No.: 248,253

[22] Filed: Sep. 20, 1988

Related U.S. Application Data

[63] Continuation of Ser. No. 180,609, Apr. 5, 1988, abandoned, which is a continuation of Ser. No. 894,801, Aug. 8, 1986, abandoned.

[51] Int. Cl.⁴ .............................................. E04F 19/06
[52] U.S. Cl. ..................................... 52/221; 52/238.1; 52/241; 174/48; 174/49; 160/135; 160/351
[58] Field of Search ................... 52/36, 220, 221, 241, 52/239, 238.1; 339/4, 22 R, 23; 174/48, 49, 67; 16/250, 255, 277; 160/135, 351

[56] References Cited

U.S. PATENT DOCUMENTS

| | | | |
|---|---|---|---|
| 2,156,633 | 5/1939 | Ducer | 339/22 R |
| 3,160,244 | 12/1964 | Kushner et al. | 52/221 |
| 3,194,361 | 7/1965 | Thurman | 52/239 X |
| 3,462,892 | 8/1969 | Meyer | 174/49 |
| 3,529,389 | 9/1970 | Wilkins | 52/221 |
| 3,808,760 | 5/1974 | Ward | 52/221 |
| 3,823,251 | 7/1974 | Heithecker et al. | 52/221 X |
| 4,060,294 | 11/1977 | Haworth et al. | 339/4 |
| 4,278,834 | 7/1981 | Boundy | 174/48 |
| 4,353,411 | 10/1982 | Harter et al. | 52/221 |
| 4,354,052 | 10/1982 | Albany et al. | 52/220 |
| 4,367,370 | 1/1983 | Wilson et al. | 174/48 |
| 4,370,008 | 1/1983 | Haworth et al. | 339/4 |
| 4,375,010 | 2/1983 | Mollenkopf | 174/48 |
| 4,391,073 | 7/1983 | Mollenkopf et al. | 52/221 X |
| 4,423,284 | 12/1983 | Kaplan | 52/221 |
| 4,535,577 | 8/1985 | Tenser et al. | 52/221 |
| 4,559,410 | 12/1985 | Hostetter | 174/48 |
| 4,601,137 | 7/1986 | Bates | 52/221 |
| 4,631,881 | 12/1986 | Charman | 52/220 |

FOREIGN PATENT DOCUMENTS

939117 10/1963 United Kingdom ................. 174/67

Primary Examiner—David A. Scherbel
Assistant Examiner—Richard E. Chilcot, Jr.
Attorney, Agent, or Firm—Flynn, Thiel, Boutell & Tanis

[57] ABSTRACT

A wall having an interior channel extending vertically along one and preferably both end edges thereof. This interior channel is closed by an openable door arrangement which can be hingedly moved into an open position so as to uncover one side of the channel and permit cables to be laid directly therein. The door arrangement is externally covered by a portion of the flexible side mat which extends over the entirety of the panel side, including the door, so as to permit the portion thereof over the door to hinge outwardly when the door is opened so that removal of the side mat is not required. The side mat is formed as a continuous covering so as to avoid undesired seam or joint lines.

11 Claims, 7 Drawing Sheets

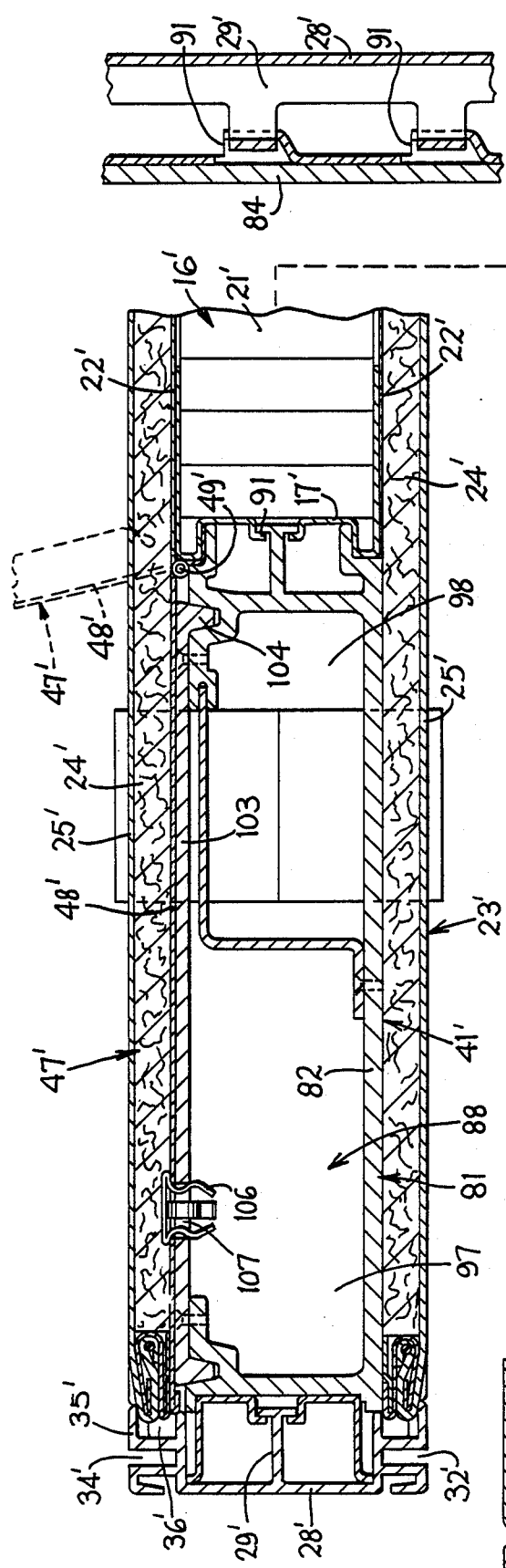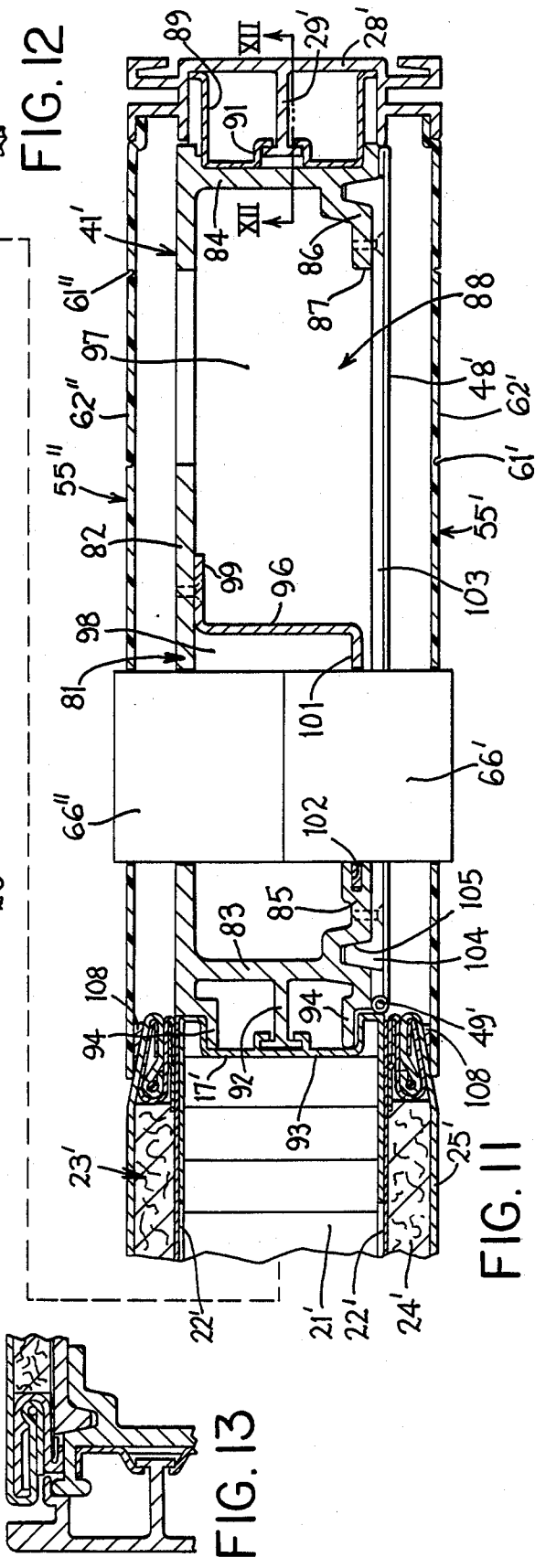

WALL PANEL WITH ACCESSIBLE INTERIOR CHANNELS FOR LAYING IN OF CABLES

This application is a continuation of U.S. Ser. No. 180,609, filed Apr. 5, 1988, now abandoned, which is a continuation of U.S. Ser. No. 894,801, filed Aug. 8, 1986, now abandoned.

FIELD OF THE INVENTION

This invention relates to a wall system formed from a plurality of series-connected panels and, more specifically, to an improved panel having interior vertical channels adjacent the end edges thereof and accessible by openable doors which are hidden beneath the side mats of the panel to facilitate laying in of electrical and/or communication cables into the channels.

BACKGROUND OF THE INVENTION

U.S. Pat. Nos. 4,060,294, 4,370,008 and 4,367,370, all owned by the assignee of this application, disclose interior wall systems for dividing offices and other interior regions into smaller work areas. These systems include a plurality of prefabricated panels releasably joined together and individually electrically prewired to facilitate the supplying of electric energy to individual work areas. The panels are provided with power blocks adjacent the opposite lower corners thereof, which power blocks are electrically joined by cabling extending along the lower edge of the panel. The power blocks are adapted for connection to up to two flexible electrical connectors for transmitting electrical energy to adjacent series-connected panels.

In wall systems of the aforementioned type, electrical energy is typically supplied to the panels from a floor or ceiling monument, and when the latter is used, the electrical supply cable is normally fed downwardly through a separate power pole connected between adjacent panels or through an interior vertical channel adjacent one end of the panel. These interior vertical channels adjacent opposite ends of the panel are also often utilized for feeding electrical or communication cables vertically therethrough such as for connection to lights mounted on the tops of the panel or for electrical or communication equipment mounted on desk-height work surfaces mounted on the panel. The positioning of electrical and/or communication cables within these interior vertical channels, however, is a difficult operation since the cables must normally be fed through the cables from one end to the other so that not only must a free end of the cable be available, but also the feeding of the cable upwardly or downwardly through this closed channel is complex and time consuming.

Because of the limitations of these interior vertical channels and the increased need for electrical and communication cables at desk-height work surfaces, numerous panel modifications have been suggested in an attempt to facilitate the vertical feeding of electrical and communication cables. For example, one proposal involves the positioning of a horizontal raceway on the panel substantially at mid- or worksurface height, which raceway has a removable or horizontally hinged cover to provide an accessible channel across the panel. This arrangement, however, destroys the esthetics of the panel since the worksurface height raceway divides the side fabric of the panel into upper and lower pads which significantly visually impair the overall appearance of the panel. This is particularly important in situations where the panels define a walkway or corridor since these raceways, by being exposed on both sides of the panel, cause the panels to have an undesirable appearance when used in situations where worksurfaces are not mounted thereon. Further, while this proposal facilitates the positioning of power and/or communication cables directly along worksurface height, nevertheless it does not facilitate the vertical feeding of these cables either upwardly or downwardly relative to the worksurface, such as to top-mounted lights, and such cables generally must still be fed vertically through a closed interior channel or in the alternative are left exposed exteriorly of the panel, neither of which is desired.

Another panel proposal has maintained the prewired electrical raceway along the lower edge thereof. In this proposal, however, access to the closed interior vertical channels requires removing the entire side mat (that is, the fabric covering and underlying sound- o absorbing material) of the panel so as to provide access to the interior channels to permit laying-in of cables. While this obviously facilitates the handling of cables, nevertheless the necessity of removing the entire side mat creates obvious disadvantages. For example, removing the side mat is a cumbersome and difficult operation, and not only restricts the manner in which the side mat can be mounted on the panel, but increases the potential of damaging the mat due to the substantial size thereof in relationship to its thickness and flexibility. Further, constructing a side mat having desired visual and acoustical properties, coupled with desired strength, is further complicated when one attempts to mount the side mat so as to permit its ready removal from the side of the panel. Still further, all panel-hung components such as worksurfaces and file cabinets must be removed in order to permit removal of the side mat, and hence this greatly complicates the laying-in of cables.

A further panel proposal utilizes a side mat which is split into two or three vertically spaced parts so that only the upper or lower mat parts need be removed if desired. While this arrangement provides limited access to the interior channels without requiring removal of all panel-mounted components, nevertheless this multiple-part mat still possesses most of the same disadvantages which exist with respect to the panel proposal which involves removal of the entire side mat. In addition, the panel employing multiple removable mat parts has the added disadvantage that this creates additional visible joint lines which extend horizontally across the panel side. These joint lines significantly visually affect the overall appearance of the panel, and more significantly create a visual appearance which customers have generally found unacceptable or undesirable.

Accordingly, it is an object of this invention to provide an improved panel which includes interior cable-receiving channels extending vertically thereof, which panel overcomes the aforementioned disadvantages by providing a highly desirable exterior appearance while at the same time simplifying and facilitating the laying-in of electrical and/or communication cables into the interior channels.

More specifically, in the improved panel of this invention, the panel has an interior channel extending vertically along one and preferably both end edges thereof. This interior channel is closed by an openable door arrangement which can be hingedly moved into an open position so as to uncover one side of the channel and permit cables to be laid directly therein. The door arrangement is externally covered by a portion of the side mat which extends over the entirety of the panel, including the door, which side mat is flexible so as to permit the portion thereof over the door to hinge outwardly when the door is opened so that removal of the side mat is not required. At the same time the side mat can be formed as a continuous covering so as to avoid creation of undesired visual seam or joint lines.

In the panel of this invention, as aforesaid, the hinged door arrangement is preferably provided with upper and lower doors which are vertically spaced apart and are individually hinged. The upper and lower doors are separated by a removable cover member positioned substantially at worksurface height, which cover member is provided with openings or ports for permitting electrical or communication cables to extend therethrough, or for permitting receptacle units to be associated therewith. By removing the cover member, which can be accomplished without demounting the worksurface from the panel, then the upper and lower doors can be individually opened without demounting the worksurface, and cabling can be fed to or from the worksurface either upwardly or downwardly relative thereto to facilitate the laying-in of cables through the interior vertical channels, particularly when these cables extend through horizontal channels along the upper and/or lower edges of the panel. After the cabling has been laid into the vertical channels, then the upper or lower doors can be hingedly swung back into their closed positions so as to protectively enclose the cabling and visually hide it. The panel then provides a visually desirable appearance in that it has a substantially continuous one-piece side mat which totally overlies and covers the interior channels and the cables therein.

In a preferred embodiment of the invention, the improved panel utilizes a panel-like core structure of a standard size, which core structure is normally adapted to have end trim rails removably attached thereto, such as through the cooperation of a plurality of interfitting hooks and slots, as is conventional. This panel- 0 like core structure has a cabling channel member attached to each end thereof through the standard hook-and-slot connection, and this cabling channel member in turn has the end trim rail attached to the outer end thereof through the standard hook-and-slot connection. The panel-like core structure, with the cabling channel members attached to opposite ends thereof, defines a panel of standard width. For example, the panel-like core structure can be a unit as manufactured for a standard three-foot wide panel, and by utilizing cabling channel members which are about six inches in width, then the overall panel as formed is thus of a standard four-foot width. This improved panel permits utilization of a standard-width panel-like core structure which can either be utilized to permit forming of a standard panel of one width, or can have cabling channel elements attached thereto so as to form a different standard-width panel having the accessible cabling channels of this invention associated therewith.

Other objects and purposes of the invention will be apparent to persons familiar with structures of this general type upon reading the following specification and inspecting the accompanying drawings.

BRIEF DESCRIPTION OF THE DRAWINGS

FIG. 11 is an enlarged fragmentary sectional view taken substantially along line XI—XI in FIG. 10.

FIG. 12 is a fragmentary sectional view taken substantially along line XII—XII in FIG. 11.

FIG. 13 is a fragmentary sectional view showing a further variation.

Figure 1:
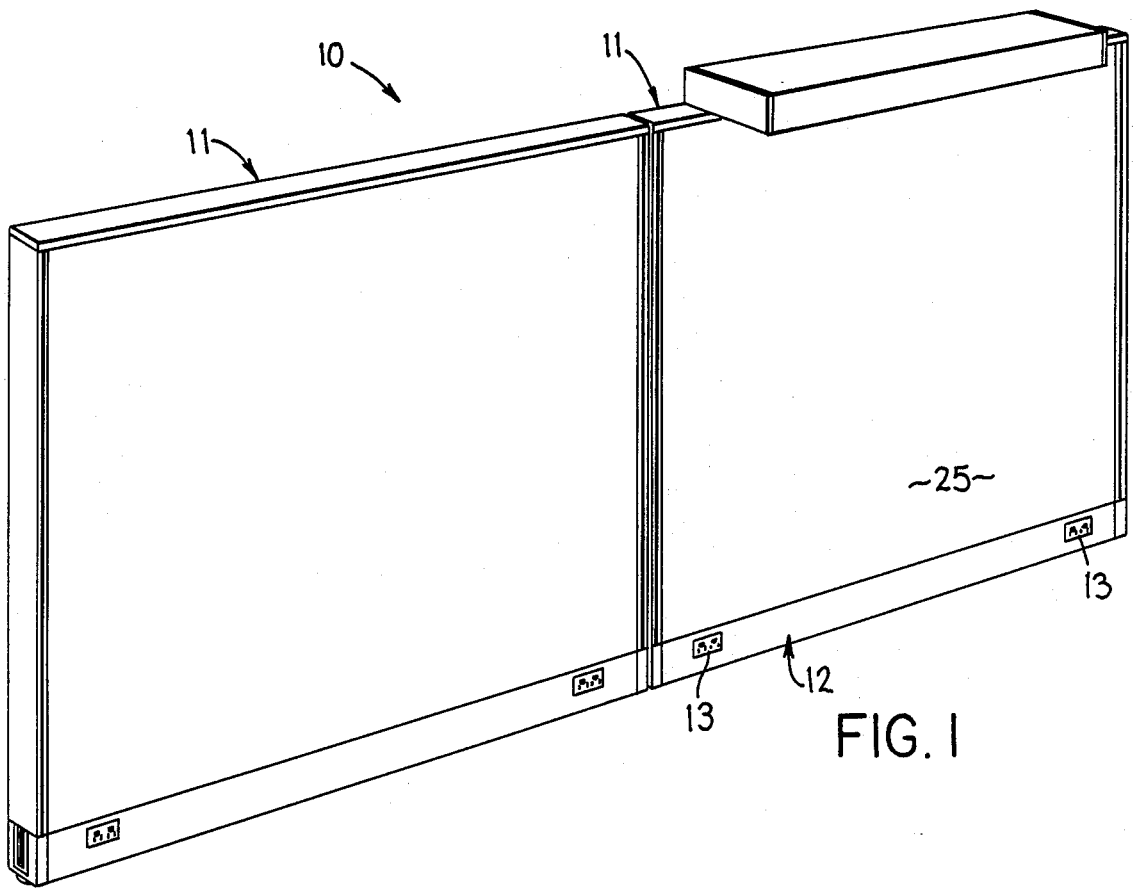
FIG. 1 illustrates a wall system wherein two panels are horizontally series-connected.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the panel and designated parts thereof. Said terminology will include the words specifically mentioned, derivatives thereof, and words of similar import.

DETAILED DESCRIPTION

Referring to FIG. 1, there is illustrated a wall system 10 formed by a series of interconnected upright prefabricated wall panels 11, only two substantially identical such panels being illustrated.

The panels 11 are preferably electrically prewired, and for this purpose are provided with a hollow channel-like raceway 12 extending along the lower edge thereof. The raceway 12 encloses therein a pair of electrical power blocks disposed adjacent the opposite lower corners of the panel, which power blocks typically have conventional receptacle units 13 selectively associated therewith and accessible from the sides of the panel. These power blocks are electrically prewired together by electrical cabling which extends longitudinally within the interior of the raceway. The raceway 12 can also accommodate therein communication cables, if desired.

Each panel 11 includes an internal panel-like core structure 16 (FIG. 7) having a substantially rigid ring-like rectangular frame formed by vertical and parallel side frame elements 17 which are rigidly joined together by parallel top and bottom frame elements 18 and 19, respectively. These frame elements are typically channel members. This rectangular frame confines therein a core 21 (FIG. 3), normally a honeycomb layer or similar conventional structure. The core and frame are secured to and between a pair of thin facing sheets 22, such as thin metal sheets conventionally referred to as side skins. The side skins 22, the intermediate core 21 and the surrounding frame 19 define the panel-like core structure 16, the latter being of a laminate-like construction so as to provide the panel 11 with the desired strength and rigidity.

The side skins 22 are in turn covered by a flexible side covering or mat 23. This mat 23 typically includes an underlying flexible layer 24 of a sound-absorbing material such as fiberglass, and this underlying layer 24 in turn is covered by a thin flexible fabric covering layer 25. This fabric covering 25 defines the exposed exterior side surface of the panel 11. The edges of fabric covering 25 are retained in a conventional manner, such as by conventional retainer strips 26 which extend around the edge of the core structure.

The panel 11 also includes a removable channel-like top cap 27 (FIG. 2) which extends horizontally along the upper edge of the frame, and a pair of vertically extending trim rails 28 which removably attach to the opposite vertical edges (that is, the ends) of the core structure. These trim rails 28 have a plurality of vertically spaced hooks 29 (FIG. 3) projecting inwardly therefrom, which hooks are of a generally T-shaped cross section so as to cooperate with a vertically extending row of pockets or slots formed in the frame to securely but removably attach the trim rail to the frame.

The trim rail 28 has a pair of L-shaped slots 31 formed in the end face thereof, which slots extend vertically (that is, longitudinally) throughout the length of the rail adjacent the opposite edges thereof for accommodating plastic hinge elements which permit adjacent panels 11 to be joined together. The trim rail 28 also has slots 32 which open in opposite directions, namely toward the opposite sides of the panel. These slots 32 terminate in a rear wall 33 which is provided with a vertically spaced series of openings therein for accommodating mounting hooks associated with furniture components such as worksurfaces or filing cabinets which are adapted to be mounted on the panels adjacent either side thereof. The slots 32 are bounded on one side thereof by a sidewall 34 which projects outwardly from the rear wall 33. Sidewall 34 terminates in a front flange 35 which is spaced forwardly from the rear wall 33 and defines therebetween a sidewardly opening groove 36 which is adapted to accommodate therein a vertically extending edge of the side mat 23 so as to improve the visual appearance of the panel.

The structure of panel 11 as described above is conventional, and such structure is described in greater detail in assignee's earlier U.S. Pat. Nos. 4,060,294, 4,370,008 and 4,367,370.

Considering now the improvements of the present invention, the panel 11 is provided with a cable-receiving channel means 41 extending vertically along at least one, and preferably both, edges thereof. This channel means 41, which extends throughout substantially the complete height of the panel, includes a base wall 42 which is positioned substantially midway between the side surfaces of the panel and, at its outer edge, terminates in an end wall 43 which is adapted to mountably cooperate with the trim rail 28. For this purpose, the channel means 41 defines a slotted channel 44 which opens centrally inwardly from the end wall 43 to accommodate the T-shaped hooks 29.

The base wall 42 of the channel means 41 is, in the illustrated embodiment, fixedly, here integrally, joined to the side frame element 17 and projecting outwardly therefrom. The channel means 41 thus defines a pair of vertically elongated cable-receiving channels 45 which are disposed on opposite sides of the base wall 42 and are adapted to be individually accessible from opposite sides of the panel. Each of these channels 45 extends vertically throughout the complete height of the panel, whereupon the upper ends of channels 45 communicate with the horizontal channel which extends through the top frame channel 18, and similarly the lower ends of these channels 45 communicate with the channel which extends horizontally through the bottom raceway 12.

Figure 3:
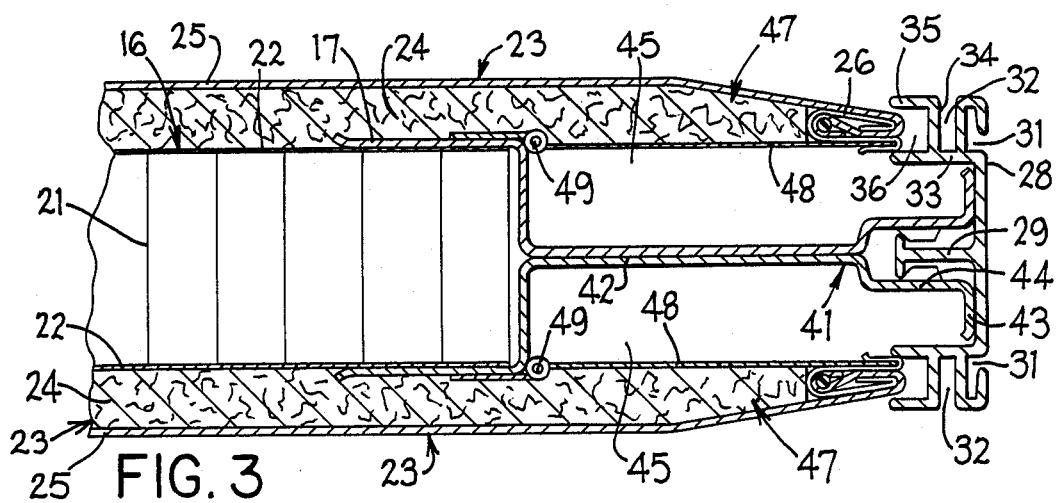
FIGS. 3, 4 and 5 are enlarged, fragmentary sectional views taken along lines III—III, IV—IV and V—V, respectively, in FIG. 2.

To visually hide the channels 45 while at the same time permitting convenient access thereto to permit laying-in of cables, the panel 11 is provided with a cover or door means 47 (FIGS. 3 and 7) associated with the side of and extending vertically over substantially the height of the panel in the vicinity of the end edge. This door means 47 includes a thin platelike door panel 48 which, along a vertical edge thereof, is hinged at 49 to the frame defining the panel-like core structure 16. This hinge 49 is formed substantially as a piano-type hinge and defines a vertical hinge axis which is disposed closely adjacent the vertical edge of the side skin 22. This vertical hinge axis is disposed substantially within or slightly inwardly from the vertical plane of the side skin so that the door panel 48, when the door means is in the closed position illustrated by FIG. 3, is substantially vertically coplanar with the respective side skin 22.

The other vertical edge of the door panel 48, namely its free edge, is normally disposed to substantially abut against the rear wall 33 on the adjacent trim rail 28 when the door means 47 is closed so as to totally cover the underlying channel 45. The door panel 48, along the free vertical edge thereof, is provided with a conventional fabric retainer 26, whereupon the side mat 23 which extends over the side skin 22 also integrally and coextensively extends over the door panel 48. That is, the fiberglass layer 24 extends coextensively over both the side skin 22 and the door panel 48, and the outer fabric 25 also extends coextensively over the skin 22 and the door panel 48, with the outer vertical edge of the fabric 25 being secured by the retainer clip 26 secured to the free edge of the door panel 48. The edge of the side mat 23, when the door means 47 is closed, is adapted to slightly project into the groove 36 as illustrated by FIG. 3 so as to maintain the door means 47 closed due to the front flange 35 slightly overlapping the free edge of the door means. This arrangement also improves the visual appearance of the panel by eliminating visual gaps or spaces between adjacent components.

The opening of the door means 47, and the structure permitting such opening, will be explained hereinafter.

When using a wall panel 11 of this type, it is conventional to mount a desk-like worksurface means on the panel adjacent at least one side thereof. Such worksurface means and its mounting structure are illustrated by U.S. Pat. No. 4,198,913. A worksurface means is illustrated by dotted lines at 51 in FIG. 2, the upper surface 52 thereof normally being at conventional desk or table height. The worksurface means 51 has a lower surface 53, with the region thereunder generally being relatively free.

Figure 2:
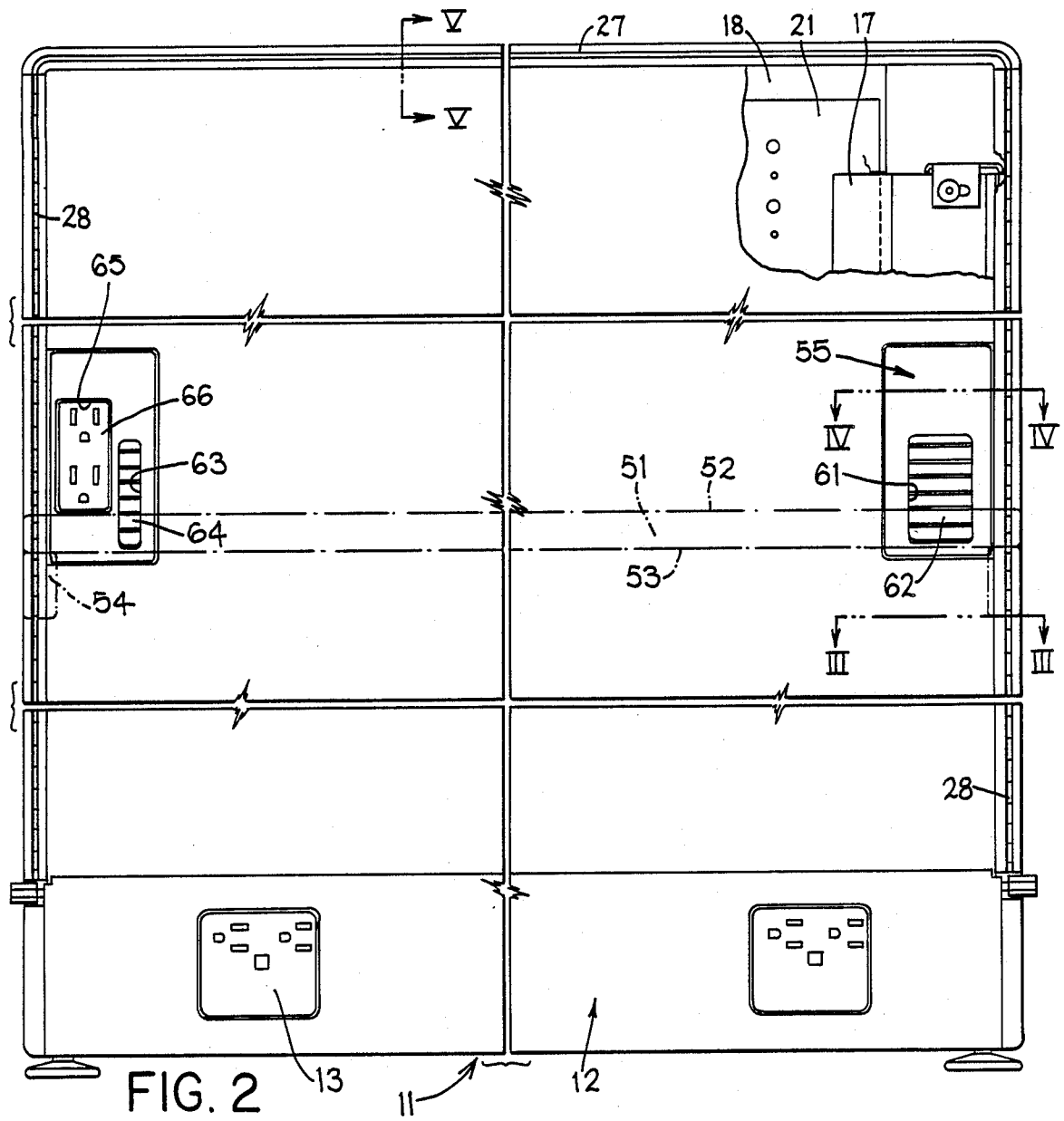
FIG. 2 is a side elevational view of the improved panel of this invention.
Figure 4:
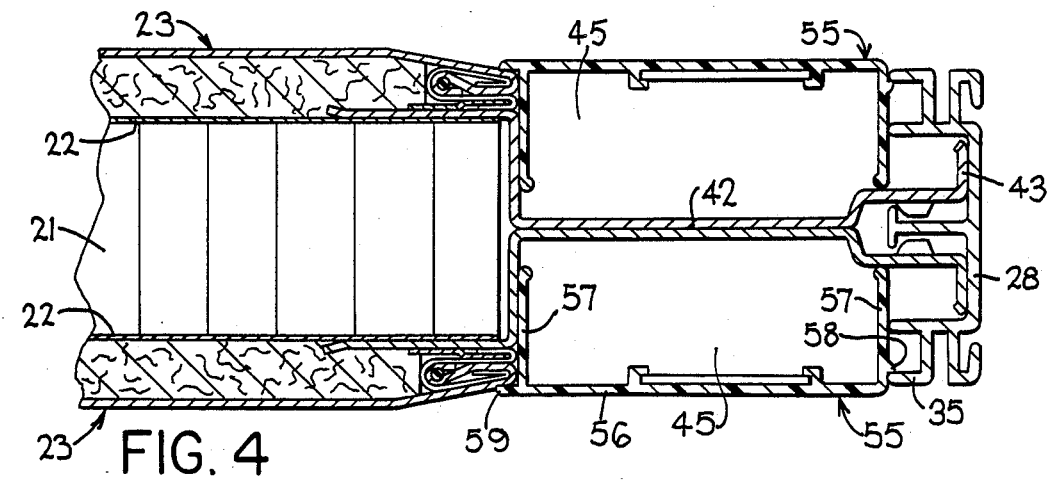
Figure 5:
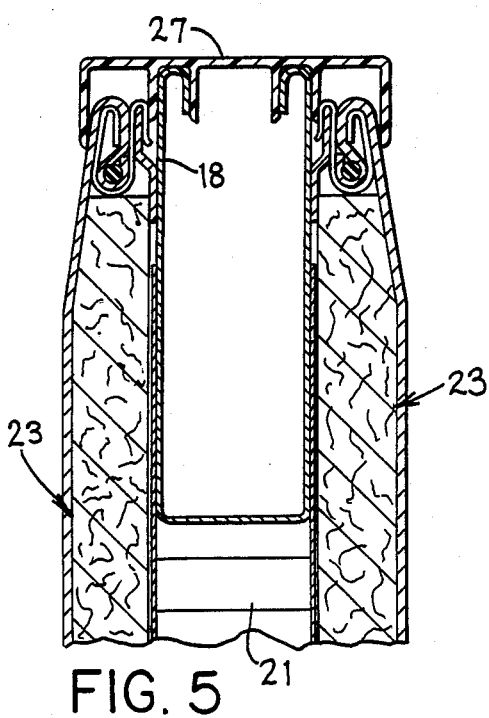
Figure 6:
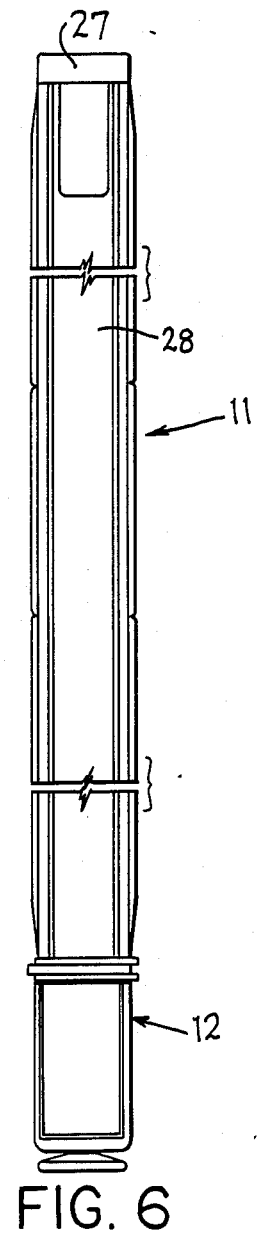
FIG. 6 is an end view of the panel of FIG. 2.
Figure 7:
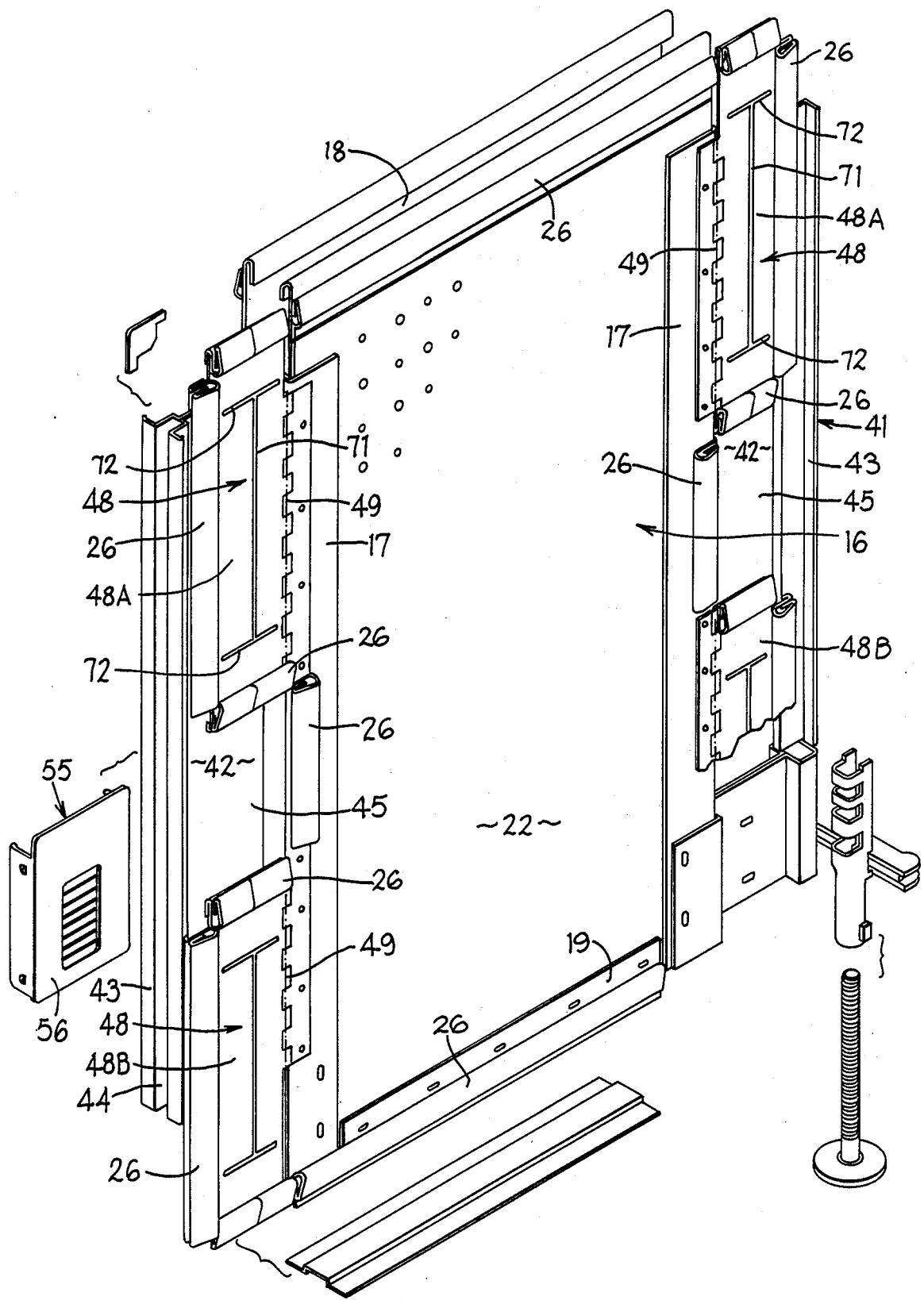
FIG. 7 is a fragmentary perspective view showing the panel with the side mats, top cap, bottom raceway and end trim rails removed.

To facilitate access to channels 45 in the improved panel of this invention, and particularly to permit such access without requiring removal of the worksurface means 51, the door means 47 is preferably divided into independently openable upper and lower doors which have been designated 47A and 47B, respectively, in FIG. 7. Each of these upper and lower doors 47A and 47B are substantially identically constructed in that each has its own vertical hinge 49, which hinges are vertically aligned with one another. The upper door 47A generally extends downwardly from the upper edge of the panel to a location which is spaced upwardly a substantial distance above the upper surface 52 of the worksurface means, and the lower door 47B extends upwardly from the lower edge of tee panel (that is, upwardly from the upper edge of the raceway 12) so that the upper edge of the lower door is normally positioned close to but a small distance downwardly from the lower surface 53 of the worksurface means. This results in the upper and lower doors being vertically spaced apart by a spacing of several inches, such as about four to eight inches. This spacing between the upper and lower doors 47A and 47B is suitably covered by a removable cap 55 as illustrated by FIGS. 2, 4 and 7.

The cap 55 is adapted to be removably positioned within and totally cover the spacing between the upper and lower doors, and for this purpose the cap 55 has a generally planar front wall 56 which is approximately flush with the side mat 23 so as to provide the panel with a pleasing appearance. The cap 55, in this embodiment, has a pair of rearwardly projecting side legs 57 which project into and effectively straddle the channel 45. One leg 57 has a detent 58 adapted to be positioned behind the trim rail flange 35 so as to assist in securing the cap to the panel. A further flange 59, which is an extension of the front wall 56, overlaps the adjacent edge of the side mat 23. The side mat 23 is provided with an appropriate rectangular cut-out along the vertical edge thereof to accommodate the cap 55. The upper and lower edges of the front wall 56 also preferably slightly overlap the adjacent edges of the respective lower and upper doors 47A and 47B. This cap 55, which is preferably molded in one piece of a plastics material, is securely positioned on the panel after the upper and lower doors are closed, and is similarly removed prior to opening of the doors.

The cap 55, in the front wall 56 thereof, is preferably provided with suitable access openings to permit electrical and/or communication cables to project outwardly therefrom for connection to electrical and/or communication equipment positioned on the worksurface means 51. For example, the cap 55 illustrated on the right side of FIG. 2 has an opening 61 through the front wall thereof which is normally maintained closed by a door 62 slidably supported rearwardly of the front wall so as to be movable upwardly when it is desired to extend cables through the opening 61. The cap 55 can also be provided with an alternate configuration as illustrated by the left side of FIG. 2. In this alternate configuration, the cap has a small opening 63 with an openable door 64 to permit electrical or communication cables to project outwardly therefrom, and the cap has a further opening 65 in which is positioned a standard duplex electrical receptacle. This receptacle is disposed directly above the worksurface means 51 to permit electrical equipment to be conveniently plugged therein.

To permit opening of the door means 47, and specifically the individual upper and lower doors, each door panel 48 is provided with means which permit bowing or elastic deforming of the door as to permit the free edge thereof to be withdrawn from the groove 36. For this purpose, the door panel 48 is provided with a vertically elongated slit or narrow slot 71 (FIG. 7) extending over a majority of the length thereof, which slit 71 is spaced substantially midway between the opposite vertical edges thereof. This slit preferably has the upper and lower ends thereof terminating in short horizontally extending slits 72 which are spaced downwardly and upwardly a small distance from the respective upper and lower edges of the door panel. The presence of this vertical slit 71, and the fact that the door panel 48 is constructed of a thin sheetlike material (preferably metal) results in the slit 71 effectively functioning as a hinge so as to permit the door panel to be deformed or deflected about this slit 71 similar to a bifold door. This permits the free edge of the door to be either withdrawn from or inserted into the groove 36 during respective opening and closing of the door.

OPERATION

When it is desired to position cables into one of the channels 45, and assuming that the worksurface means 51 is mounted on the panel, then the cap 55 is initially removed by pulling it outwardly to disengage it from the panel, and then lifting it upwardly so as to clear the worksurface means. This is possible due to the fact that the rear edge of the worksurface means 51 is normally spaced a small distance from the face of the panel. After the cap 55 has been removed, then either or both of the upper and lower doors 47A and 47B can be opened without removing the worksurface.

Figure 8:
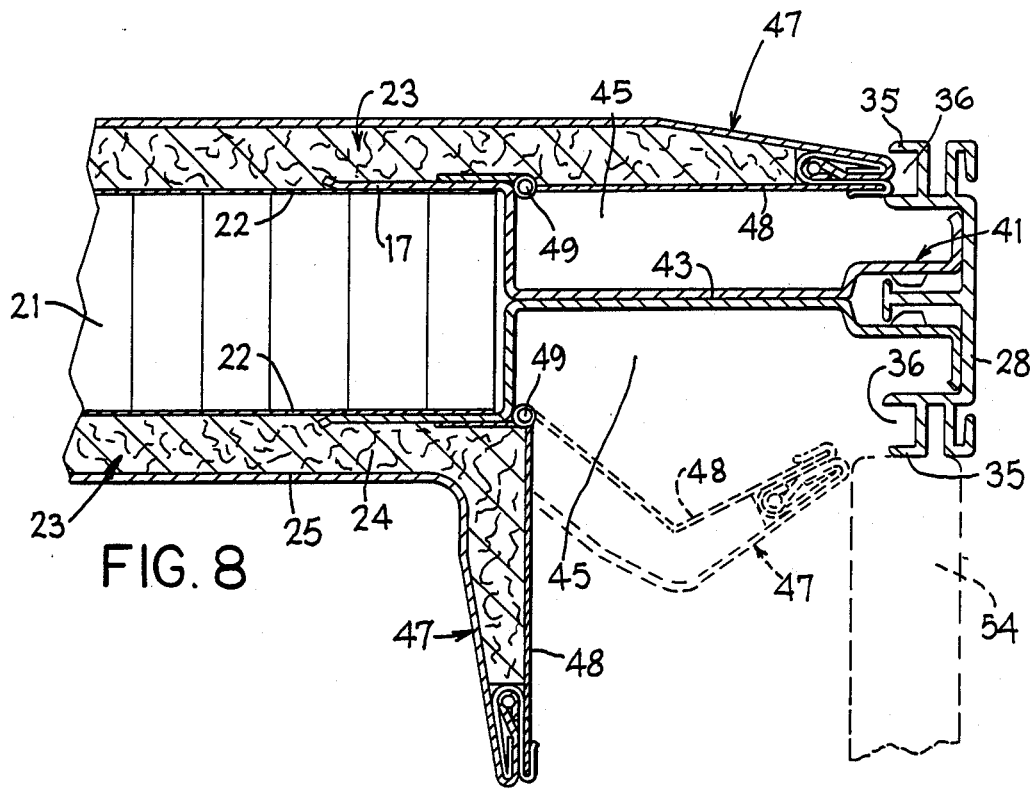
FIG. 8 is a view corresponding to FIG. 3 but showing one of the doors to the cabling channel in an open position.

Assuming that it is desired to open the upper door 47A, then the top cap 27 is removed, thereby providing access to the upper and lower edges of the upper door 47A. By manually gripping the upper and lower edges of the upper door 47A substantially at the midpoint thereof, a manual outward pulling force or pressure against the door panel causes it to deflect about the vertical slit 71 substantially as indicated by dotted lines in FIG. 8, and effect withdrawal of the free edge of the door from the groove 36. Thereafter the door can be easily manually swung into a fully open position substantially as indicated by solid lines in FIG. 8. The swinging of the door into the open position is readily facilitated by the fact that the covering layers 24 and 25 are readily flexible and suitably bend so as to accommodate the hinging of the door. With the door in its open position, this thus provides access to the underlying channel 45 throughout the full height thereof from the upper edge of the panel downwardly to the worksurface (and upwardly from the lower edge of the panel if the lower door 47B is also opened). This permits cables to be readily laid into the channel 45, following which the door is returned to its closed position by reversing the sequence of movements outlined above. If the cable is to be fed outwardly through the cap 55 for access to the worksurface 52, then the leading end is fed through one of the openings in the cap 55, and the cap thereafter snapped back into position between the upper and lower doors.

If communication cables are disposed in and extend horizontally along the top channel 18A as defined within the top frame member 18, then these cables can be readily deflected downwardly so as to be laid into the channel 45. Similarly, electrical cables can be connected to the power blocks within the lower channel-like raceway 12, and then fed upwardly by being laid into the channel 45.

If desired, the separate upper and lower doors could be replaced by a single continuous door extending the full height of the panel, which door could be wholly covered by the side mat 23 if desired. Such door could have appropriate ports and openings therein for mounting receptacles or permitting cables to extend therethrough in a manner similar to that provided by the cap 55. With such a continuous door, however, removal of the worksurface means or of any other component mounted on the panel would obviously be required prior to opening of the door.

With the improved panel of this invention as described above, the channels 45 are totally hidden when the doors are closed, and at the same time the doors are not externally visible since the side mat 23 extends continuously over the doors so as to provide a continuous exterior fabric surface which is free of undesired joint or seam lines or edges. At the same time, however, the presence of these hidden doors greatly facilitates and provides ready access to the channels 45 to facilitate the laying-in of cables therein, and does so without requiring any extensive disassembly of the panel, such as removal of the side mat.

Figure 9:
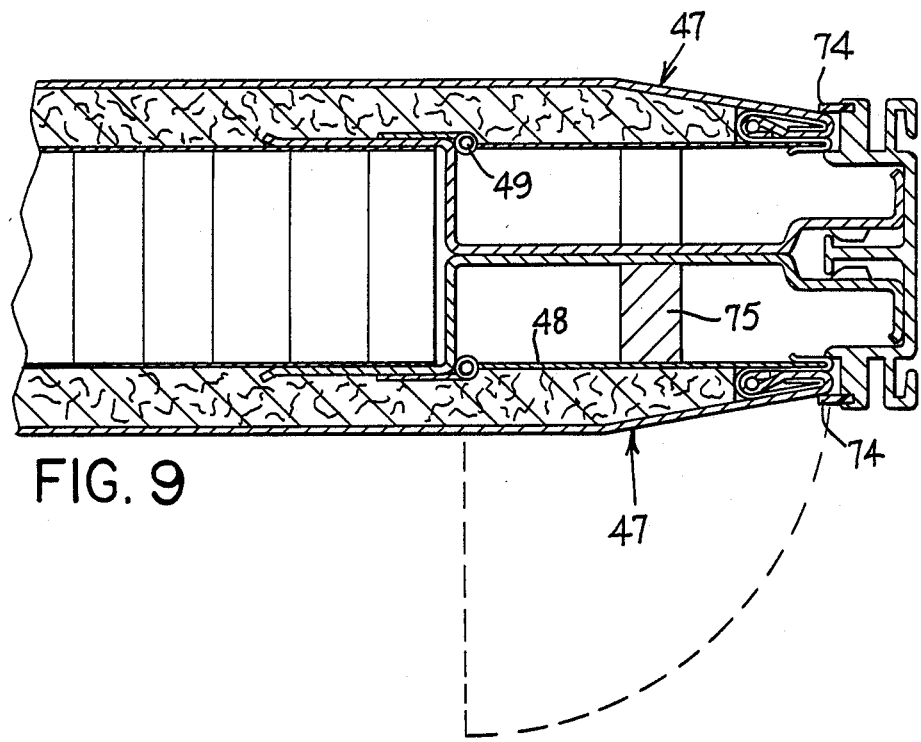
FIG. 9 is a view similar to FIG. 3 but illustrating a variation.

It will be appreciated that numerous variations could be made with respect to the construction of the door without departing from the essential improvements of this invention. For example, the vertical hinge slit 71 could be replaced with a conventional hinge if desired, although this may require utilization of some other type of latching or holding device for maintaining the door in a flat closed position. This could be achieved by providing a small torsion spring disposed in association with the central hinge so as to maintain the two parts of the door panel in its normally flat condition so as to thus maintain the door closed when engaged within the groove 36. As a further variation, the front flange 35 on the trim rail could be eliminated so that the door would hence be freely swingable between open and closed positions, and this would permit elimination of the central hinge or center hinge slit 71 associated with the door panel. This variation, however, would require utilization of a separate latching or holding device for securing the door in its closed position, such as use of a magnet 75 (FIG. 9) secured to the channel means to magnetically hold the door in its closed position. In addition, in this latter variation the rigid front flange 35 could be replaced with a flexible plastic strip 74 (FIG. 9) extending longitudinally of the trim rail, which flexible strip 74 would partially overlap the free edge of the door. This flexible strip 74 could also assist in holding the door closed, but would be sufficiently flexible so as to permit the door to be freely swung outwardly into its open position. Use of this flexible strip or flap 74 could be either in conjunction with, or as a replacement for, the holding device 75. The magnet 75 could also be replaced with any type of conventional releasable spring clip or detent arrangement.

While the embodiments described above in relationship to FIGS. 2-9 disclose a pair of cable-receiving channels 45 adjacent each edge of the panel, with the channels 45 opening outwardly on opposite sides of the panel, nevertheless it will be apparent that such oppositely opening channels could be provided adjacent only one edge of the panel if desired, or alternately only one such channel need be provided adjacent each side of the panel. Provision of two such channels adjacent each edge of the panel is preferred, however, since this permits electrical and communication cables to be isolated from one another by running them through separate channels. For example, with respect to the communication and electrical cables which are intended for access to a worksurface disposed adjacent one side of the panel, the communication cables would preferably be run through one of the channels located adjacent one end of the panel, and the electrical cables would be run through the channel disposed adjacent the other end of the panel.

Figure 10:
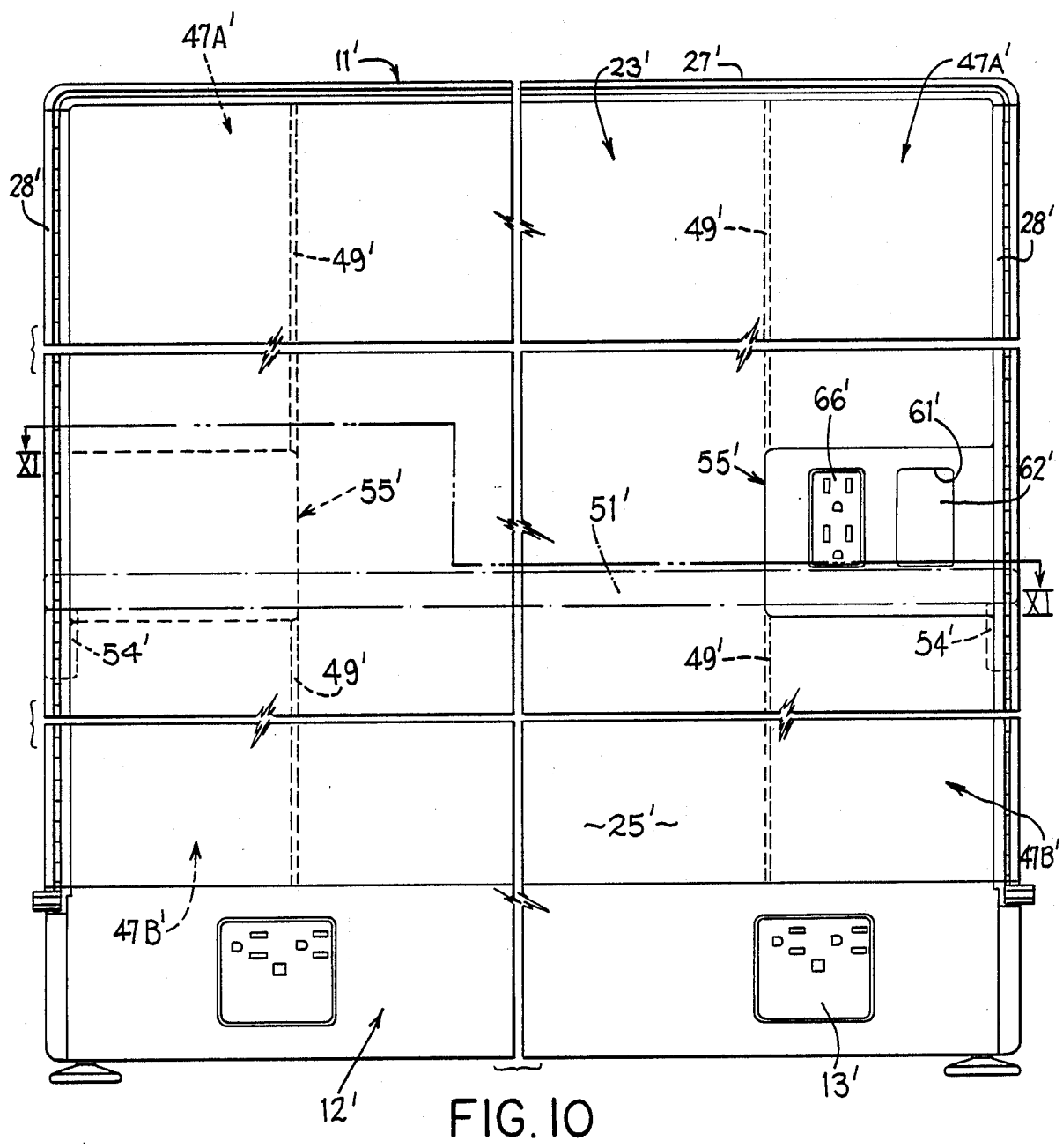
FIG. 10 is a side elevational view of a further, and preferred, embodiment of the improved panel.

Reference is now made to FIGS. 10-12 which illustrate a preferred embodiment of the panel according to the present invention. The panel illustrated by FIGS. 10-12 incorporates therein many of the same structural and functional relationships possessed by the panel illustrated by FIGS. 2-9, and hence the embodiment of FIGS. 10-12 uses the same reference numerals utilized above for designating corresponding parts but with the addition of a prime (') thereto The panel 11' of FIGS. 10-12 again employs a panel-like core structure 16' having a honeycomb 21' confined within a rigid rectangular ringlike frame and bounded on opposite sides by sheetlike metal plates or skins 22'. In this embodiment, however, the side or vertical frame elements 17' have a row of vertically spaced slots or pockets 93 associated therewith, which slots are of conventional construction and are adapted to receive therein the T-shaped hooks 29' associated with the standard trim rail 28'. In fact, the panel-like core structure 16' is a standard component manufactured by the assignee of this invention so as to permit manufacture of a standard width panel of known construction. For example, this core structure 16', by securing the conventional side trim rails 28' to opposite ends thereof, permits creation of a standard width panel.

According to the present invention, this standard width core structure 16' has the improved cable-receiving channel means 41' of this invention attached to the opposite ends thereof, which channel means 41' in turn permit the trim rails 28' to be attached thereto so as to define a panel of standard width. For example, by using a standard core structure 16' for a standard three-foot panel, and by attaching the channel means 41' of this invention to the opposite edges thereof, the present invention is able to provide a standard four-foot wide panel incorporating therein the improved cable handling capability of the present invention.

The cable-receiving channel means 41' of this embodiment, as illustrated by FIG. 11, is of a multiple-part construction and includes a vertically elongated channel member 81 which extends vertically along the edge of the panel throughout substantially the full height thereof. This channel member 81 has a rear or base wall 82 which extends substantially coplanar with one of the side skins 22'. A pair of sidewalls 83 and 84 project from the base wall 82 and terminate in inwardly opposed front flanges 85 and 86 which are disposed adjacent the other side of the panel. These opposed vertically extending front flanges 85 and 86 define a vertically elongated access opening 87 therebetween which provides access to the vertically elongated channel-like space 88 defined within the interior of the channel member 81.

The outer sidewall 84 of channel member 81 has a vertically elongated channel-shaped mounting strip or rail 89 secured thereto, which rail has a plurality of conventional hook-receiving slots or pockets 91 formed therein in vertically spaced relationship. These slots 91 receive therein the standard T-shaped hooks 29' associated with the trim rail 28'. The side legs of this mounting rail 89 also nestably interfit into the channel-like configuration of the trim rail 28' to facilitate the mounting thereof onto the panel.

The inner sidewall 83 of channel member 81 has a plurality of vertically spaced hooks 92 projecting outwardly therefrom, the latter hooks 92 also being of a conventional T-shaped cross section so as to engage with the slots 93 associated with the side frame element 17'. The hook-slot arrangement 92-93 is identical to that defined by 29'-91. The sidewall 83 also has a pair of outwardly projecting parallel flanges 94 which nestingly interfit within the channel-like shape of the side frame member 17' to assist in rigidly joining the channel member 81 to the core structure 16'.

The cable-receiving channel means 41' also includes a substantially Z-shaped divider wall 96 positioned within and fixedly attached to the channel member 81. This divider wall 96 divides the main channel space 88 into a pair of parallel side-by-side channels 97 and 98. The divider wall has the rear leg 99 thereof fixedly attached to the base wall 82, as by screws, whereby the channel 97 is defined between the sidewall 84 and the divider wall. The divider wall also has a front leg 101 which is disposed substantially within the opening 87 and extends sidewardly so that the free edge of leg 101 is accommodated within a slot 102 formed in the front flange 85. This results in the other channel 98 being defined rearwardly of the front leg 101 so that channel 98 is substantially closed and isolated from channel 97. This divider wall 96 can be easily removed by initially removing the screws from the leg 99 and then slipping the leg 101 out of the slot 102.

The channel means 41' also includes a vertically elongated cover 103 which is adapted to close off the front opening 87. This cover 103 lies closely adjacent the front leg 101, and has tapered flanges 104 extending vertically along the opposite edges thereof. These flanges 104 are accommodated within tapered grooves 105 formed in the front flanges of the channel member 81. Cover 103 and channel member 81 are also releasably attached to one another by removable screws which are accessible from the front face of the cover. This cover 103 effectively closes off the vertical channels 97 and 98.

The channel means 41' is accessible through the openable door means 47', the latter having a thin metal backing panel 48' which is hinged at 49' similar to the door structure 47 described above. This door panel 48' substantially directly overlies and in fact effectively abuttingly contacts the front face of the cover 103 when the door means 47' is in its closed position. The door panel 48', in the embodiment illustrated by FIGS. 10-11, is again preferably provided with an I-shaped slit therein similar to the slits 71-72 illustrated by FIG. 7 so as to provide a resiliently flexible hinging effect to permit the free edge of door means 47' to be positioned into or removed from the groove 36'. However, if the flange 35' is eliminated, then the door means can be provided with any other type of latching device for holding it closed, such as a spring-type latch member 106 carried by the door and disposed for cooperation with a suitable opening 107 formed in the cover 103. With this latter type of arrangement, the door means 47' can be freely swung between open and closed positions without requiring movement of the type indicated by dotted lines in FIG. 9.

In this embodiment of the panel 11', the door means 47' again preferably split into independently swingable upper and lower portions designated 47A' and 47B' in FIG. 10, and these upper and lower portions are preferably vertically spaced apart to accommodate the removable cap 55' therebetween, which cap extends between the upper and lower door portions and across the full width of the door. The front face of this cap is disposed so as to be substantially flush with the surface of mat 23'. The cap 55' can be removably held to the panel by any conventional detent means, such as a Velcro strip 108 extending along the vertical edge thereof which overlaps the mat. The other vertical edge of cap 55' is trapped behind the flange 35', being held in this position due to the upper and lower edges of cap 55' being disposed in overlapping engagement with the respective doors 47A' and 47B'. This cap 55' is provided with openings therein for accommodating a conventional electrical receptacle 66', which receptacle is mounted within the channel 98 and project outwardly through suitable openings in the divider wall 96 and cap 55' so as to be externally accessible. The channel 98 accommodates therein electrical cables which can be joined to the receptacle 66'. The cap 55' also has a further opening 61' therein which is normally covered by a removable door or plug 62', and this opening provides access therethrough so that communication cables within the channel 97 can project outwardly for connection to communication equipment disposed on the worksurface.

While this FIGS. 10-11 embodiment has a hinged door adjacent the panel end on only one side thereof, nevertheless the mat 23' on the opposite side may optionally be provided with a cutout in which is positioned a further cap 55''. This cap 55'' is substantially or preferably identical to cap 55' and disposed directly opposite therefrom, and is similarly removably held in position. A further electrical receptacle 66'' can be mounted on member 81 within the channel 97 and project through openings in wall 82 and cap 55'' so as to be accessible from the opposite side of the panel. The other opening 61'' permits communication cables to be fed therethrough.

By using independently swingable upper and lower doors separated by the intermediate cap 55', which cap typically extends from a location slightly below the worksurface means 51' to a location disposed thereabove, this permits the upper and lower doors to be independently swingably moved into an open position to access the channels 97-98 without removing the worksurface means. After the door has been opened, the underlying cover 103 is also removed by removing the appropriate securing screws. This cover 103 is preferably split into upper and lower portions which extend throughout the vertical height of the individual doors to permit their independent removal depending upon which of the doors is opened. The cover 103 provides a backing for the doors but, more significantly, it cooperates with channel member 81 to define a closed hollow tube so as to provide the panel with great strength and rigidity.

With the arrangement illustrated by FIGS. 10-11, each panel has only a single door on each side thereof, with the doors on opposite sides being disposed adjacent opposite ends of the panel. Further, the channel means 41' which is secured to opposite ends of the core structure 16' are identical and can be readily attached to a standard-width core, such as a three-foot wide core, so as to permit creation of a standard four-foot wide panel having improved cable laying-in capability. Of course, if desired, the panel can be provided with the cable means 41' attached to only one edge thereof, although such would obviously reduce the versatility of the panel in terms of its orientation when in use.

The improved panel 11' again possesses the advantages mentioned above relative to the panel 11 inasmuch as the flexible and continuous side mat 23' extends not only over the side skins 22′ but also over the door panels 48′ to hence provide a continuous exterior fabric so as to provide a panel wherein the hinged doors are totally hidden, wherein additional seams or joint lines are eliminated, and wherein optimum esthetics of the panel are maintained.

FIG. 13 illustrates an arrangement like that of FIG. 11 except that wall 34′ and flange 35′ on the trim rail 28′ are eliminated so that the free edge of mat 23′ is hence exposed and defines a side boundary for the slot 32′. With this arrangement, the doors 47A′ and 7B′ can be hingedly moved between opened and closed positions without requiring any intermediate vertical hinging or flexing (such as defined by slit 71). However, if the mounts 54′ for the worksurface means 51′ remain mounted on the panel, then the doors will still require the intermediate hinge or flex line 71 so as to be openable without removing the worksurface means.

Although particular preferred embodiments of the invention have been disclosed in detail for illustrative purposes, it will be recognized that variations or modifications of the disclose apparatus, including the rearrangement of parts, lie within the scope of the present invention.

The embodiments of the invention in which an exclusive property or privilege is claimed are defined as follows:

1. In a wall system formed from a plurality of upright prefabricated panels which are horizontally serially connected, at least one said panel including an upright panel-like core structure, said upright panel-like core structure including a pair of substantially vertically planar side plates disposed in substantially parallel relationship and secured adjacent opposite sides of a substantially rectangular frame, said frame including substantially horizontally extending top and bottom frame elements secured between the parallel side plates adjacent upper and lower edges thereof, said frame also including substantially parallel vertically extending side rails secured between said side plates adjacent opposite vertical edges thereof, and a pair of vertically enlarged flexible fabric-like side mats extending substantially coextensively over the planar side plates of the panel-like core structure for defining exterior vertical side surfaces of the panel, the improvement comprising vertically elongated cable-receiving channel means stationarily secured to and extending vertically along at least one side rail of said core structure substantially between said side mats, said channel means defining therein a vertically extending channel for receiving cables therein, said channel means having a vertically elongated opening in a sidewall thereof for providing access to said channel, said opening facing toward one of said vertical side surfaces of said panel, door means swingably movable between a closed position wherein it closes off said opening and an open position wherein the door means projects transversely outwardly away from said one vertical side surfaces so as to provide free access to said channel through said opening, said door means including a door member which is hingedly interconnected to said core structure for swinging movement about a substantially vertical axis, said door means also including a flexible fabric-like mat part positioned externally of and extending coextensively over said door member, said mat part being integral with and defining a part of said side mat so as to define a substantially continuous exterior surface which visually hides said door means when the latter is closed, a first hook-and-slot connection means coacting between opposed vertical edges of said core structure and said channel means for releasably securing them together, a vertically elongated trim rail positioned adjacent and extending vertically along the other vertical edge of said channel means, and a second hook-and-slot connection means coacting between said trim rail and said other vertical edge of said channel means for releasably securing said trim rail to said channel means, said second connection means being identical to said first connection means so that said trim rail can be connected directly to the vertical edge of said core structure.

2. A panel according to claim 1, wherein said channel means and the channel defined therein extends vertically along said one edge of said panel throughout substantially the full vertical height thereof.

3. A panel according to claim 2, wherein said door means includes upper and lower doors which are independently swingable between said open and closed positions.

4. A panel according to claim 2, wherein the door means includes a door which extends vertically along said one edge of the panel from one of said top and bottom frame elements only to a location which is vertically spaced substantially between said top and bottom frame elements.

5. A panel according to claim 2, wherein said channel has upper and lower ends thereof respectively in direct communication with upper and lower horizontal channels which extend along the upper and lower edges of said panel.

6. In a wall system formed from a plurality of upright prefabricated panels which are horizontally serially connected, at least one said panel including an upright panel-like core structure, said upright panel-like core structure including a pair of substantially vertically planar side plates disposed in substantially parallel relationship and secured adjacent opposite side of a substantially rectangular frame, said frame including substantially horizontally extending top and bottom frame elements secured between the parallel side plates adjacent upper and lower edges thereof, said frame also including substantially parallel vertically extending side rails secured between said side plates adjacent opposite vertical edges thereof, and a pair of vertically enlarged flexible fabric-like side mats extending substantially coextensively over the planar side plates of the panel-like core structure for defining exterior vertical side surfaces of the panel, the improvement comprising vertically elongated cable-receiving channel means stationarily secured to and extending vertically along at least one side rail of said core structure substantially between side mates, said channel means defining therein a vertically extending channel for receiving cables therein, a flexible fabric-like mat part positioned externally of and extending coextensively over said channel means, said mat part being integral with and defining a part of said side mat so as to define a substantially continuous exterior surface which visually hides said channel means, a first hook-and-slot connection means coacting between opposed vertical edges of said core structure and said channel means for releasably securing them together, a vertically elongated trim rail positioned adjacent and extending vertically along the other vertical edge of said channel means, and a second hook-and-slot connection means coacting between said trim rail and said other vertical edge of said channel means for releasably securing said trim rail to said channel means, said second connection means being identical to said first connection means so that said trim rail can be connected directly to the vertical edge of said core structure.

7. A wall system according to claim 6, wherein said channel means has a rectangular tubular cross section.

8. A wall system according to claim 7, wherein said channel means includes a first generally U-shaped channel part disposed adjacent one side of said core structure, and said channel means including a removable cover part which is disposed adjacent the other side of said core structure and which seats against said channel part for closing off the vertically extending channel defined therein.

9. In a wall system formed from a plurality of upright, prefabricated panels which are horizontally serially connected, at least one said panel including an upright core structure, said upright core structure including a substantially rectangular frame, said frame including substantially horizontally extending top and bottom frame elements secured between substantially parallel vertically extending side rails, and a pair of vertically enlarged flexible fabric-like side mates extending substantially coextensively over side surfaces of the core structure for defining exterior vertical side surfaces of the panel, the improvement comprising vertically elongated cable-receiving channel means stationarily secured to and extending vertically along at least one side rail of said core structure substantially between said side mates, said channel means defining therein a vertically extending channel for receiving cables therein, a flexible fabric-like mat part positioned externally of and extending coextensively over said channel means, said mat part being integral with and defining a part of said side mat so as to define a substantially continuous exterior surface which visually hides said channel means, a first hook-and-slot connection means coacting between opposed vertical edges of said core structure and said channel means for releasably securing them together, a vertically elongated trim rail positioned adjacent and extending vertically along the other vertical edge of said channel means, and a second hook-and-slot connection means coacting between said trim rail and said other vertical edge of said channel means for releasably securing said trim rail to said channel means, said second connection means being identical to said first connection means so that said trim rail can be connected directly to the vertical edge of said core structure.

10. A wall system according to claim 9, wherein said channel means has a rectangular tubular cross section.

11. A wall system according to claim 10, wherein said channel means includes a first generally U-shaped channel part disposed adjacent on side of said core structure, and said channel means including a removable cover part which is disposed adjacent the other side of said core structure and which seats against said channel part for closing off the vertically extending channel defined therein.

* * * * *

UNITED STATES PATENT AND TRADEMARK OFFICE
CERTIFICATE OF CORRECTION

PATENT NO. : 4 841 699
DATED : June 27, 1989
INVENTOR(S) : Harold R. WILSON et al It is certified that error appears in the above-identified patent and that said Letters Patent is hereby corrected as shown below:

Column 14, line 38; change "side" to ---sides---.
            line 52; after "between" insert ---said---.
            line 53; change "mates," to ---mats,---.
Column 15, line 22; change "mates" to ---mats---.
            line 29; change "mates," to ---mats,---.
Column 16, line 23; change "on" to ---one---.

Signed and Sealed this

Twenty-second Day of May, 1990

Attest:

HARRY F. MANBECK, JR.

*Attesting Officer*      *Commissioner of Patents and Trademarks*